(12) United States Patent
Carter et al.

(10) Patent No.: US 9,171,523 B2
(45) Date of Patent: Oct. 27, 2015

(54) GPU-ACCELERATED, TWO-PASS COLORSPACE CONVERSION USING MULTIPLE SIMULTANEOUS RENDER TARGETS

(71) Applicant: Google Inc., Mountain View, CA (US)

(72) Inventors: Nicholas Carter, Seattle, WA (US); James Bankoski, Los Gatos, CA (US)

(73) Assignee: Google Inc., Mountain View, CA (US)

( * ) Notice: Subject to any disclaimer, the term of this patent is extended or adjusted under 35 U.S.C. 154(b) by 271 days.

(21) Appl. No.: 13/837,530

(22) Filed: Mar. 15, 2013

(65) Prior Publication Data

US 2014/0267371 A1 Sep. 18, 2014

(51) Int. Cl.
| | |
|---|---|
| G09G 5/00 | (2006.01) |
| G09G 5/02 | (2006.01) |
| G06T 9/00 | (2006.01) |
| G09G 5/36 | (2006.01) |
| H04N 11/20 | (2006.01) |
| H04N 11/00 | (2006.01) |
| H04N 5/46 | (2006.01) |
| G03F 3/08 | (2006.01) |
| G06K 9/00 | (2006.01) |
| G06K 9/36 | (2006.01) |
| H04N 7/01 | (2006.01) |
| H04N 1/64 | (2006.01) |
| H04N 9/64 | (2006.01) |

(52) U.S. Cl.
CPC ............... *G09G 5/02* (2013.01); *H04N 1/646* (2013.01); *H04N 7/01* (2013.01); *H04N 9/64* (2013.01)

(58) Field of Classification Search
USPC ......... 345/589–591, 600–604, 530, 545–549, 345/555; 348/254–256, 441, 445, 458, 467, 348/469, 477–479, 557–558, 560, 571, 577, 348/612, 630; 358/518–520, 523–524; 382/162, 166–167, 254, 274
See application file for complete search history.

(56) References Cited

U.S. PATENT DOCUMENTS

| | | | | |
|---|---|---|---|---|
| 4,982,270 | A | 1/1991 | Tanaka et al. | |
| 6,340,994 | B1 * | 1/2002 | Margulis et al. | 348/625 |
| 6,384,838 | B1 * | 5/2002 | Hannah | 345/601 |

(Continued)

FOREIGN PATENT DOCUMENTS

| | | |
|---|---|---|
| EP | 0358625 A2 | 3/1990 |
| WO | 9608930 A1 | 3/1996 |
| WO | 2014/149523 A1 | 9/2014 |

OTHER PUBLICATIONS

International Search Report and Written Opinion for International Application No. PCT/US2014/019293, mailed Jun. 12, 2014, 11 pages.

(Continued)

*Primary Examiner* — Wesner Sajous
(74) *Attorney, Agent, or Firm* — Brake Hughes Bellermann LLP

(57) ABSTRACT

Disclosed is a method including converting, during a first pass, video data from a first multi-component format to an intermediate multi-component format, the intermediate multi-component format including a first video component, the intermediate multi-component format including a second video component interleaved with a third video component, and converting, during a second pass, the video data from the intermediate multi-component format to a second multi-component format by de-interleaving the second component and third component.

25 Claims, 5 Drawing Sheets

(56) References Cited

U.S. PATENT DOCUMENTS

| | | | | |
|---|---|---|---|---|
| 6,741,263 | B1* | 5/2004 | Pether | 345/600 |
| 7,898,573 | B1* | 3/2011 | Linzer et al. | 348/220.1 |
| 8,880,571 | B2* | 11/2014 | Srinivasan et al. | 708/200 |
| 2010/0045695 | A1* | 2/2010 | Brown et al. | 345/589 |
| 2010/0171817 | A1* | 7/2010 | Tourapis et al. | 348/51 |
| 2012/0209287 | A1* | 8/2012 | Zhao et al. | 606/130 |

OTHER PUBLICATIONS

"Android—Convert bitmap array to YUV (YCbCr NV21)—Stack Overflown", Mar. 6, 2014, 3 pages.

Sullivan, et al, "Recommended 8-Bit YUV Formats for Video Rendering (Windows)", Apr. 2002, 9 pages.

* cited by examiner

GPU-ACCELERATED, TWO-PASS COLORSPACE CONVERSION USING MULTIPLE SIMULTANEOUS RENDER TARGETS

FIELD

Embodiments relate to color-space conversion of video data.

BACKGROUND

When converting graphics system pixel content into a video stream, the source content is typically in an interleaved RGBA color space. Video encoders typically include inputs in a planar, subsampled YUV format such as YV12. Additionally, the source content will be stored in a graphics processor frame buffer memory, as a texture or render target.

The format conversion from interleaved RGBA to planar YV12 is conventionally done by reading back the RGBA source content to system memory, and then using the CPU to color-convert, subsample, and planarize. This CPU conversion is relatively expensive in CPU resources. Further, hand-written assembly code is often used to achieve interactive performance levels.

SUMMARY

Example embodiments utilize a graphical processing unit (GPU) to perform a two pass color space conversion of video (e.g., pixel) data.

One embodiment includes a method. The method includes converting, during a first pass, video data from a first multi-component format to an intermediate multi-component format, the intermediate multi-component format including a first video component, the intermediate multi-component format including a second video component interleaved with a third video component, and converting, during a second pass, the video data from the intermediate multi-component format to a second multi-component format by de-interleaving the second component and third component.

Another embodiment includes a non-transitory computer readable medium. The non-transitory computer readable medium includes code segments that when executed by a processor cause the processor to perform steps including converting video data from a first multi-component format to a partially converted second multi-component format, the partially converted second multi-component format including a first component and interleaved second and third components, and completing the conversion to the second multi-component format by de-interleaving the second and third components.

Still another embodiment includes a video card. The video card includes a memory and a graphical processing unit. The memory includes a first buffer, the first buffer storing a vector including a first horizontal dimension and a second horizontal dimension, the first buffer including video data in a first multi-component format, a second buffer, the second buffer storing a vector including the first horizontal dimension and the second horizontal dimension, a third buffer, the third buffer storing a vector including the first horizontal dimension and the second horizontal dimension, a fourth buffer, the fourth buffer storing a vector including half the first horizontal dimension and half the second horizontal dimension, and a fifth buffer, the fifth buffer storing a vector including half the first horizontal dimension and half the second horizontal dimension. The graphical processing unit is configured to convert, during a first pass, video data from a first multi-component format to an intermediate multi-component format, the intermediate multi-component format including a first video component, the intermediate multi-component format including a second video component interleaved with a third video component, store the first component in the second buffer, store the interleaved second and third components in the third buffer, converting, during a second pass, the video data from the intermediate multi-component format to a second multi-component format by de-interleaving the second component and third component, store compressed second component in the fourth buffer, and store compressed third component in the fifth buffer.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the example embodiments and wherein.

Figure 1:
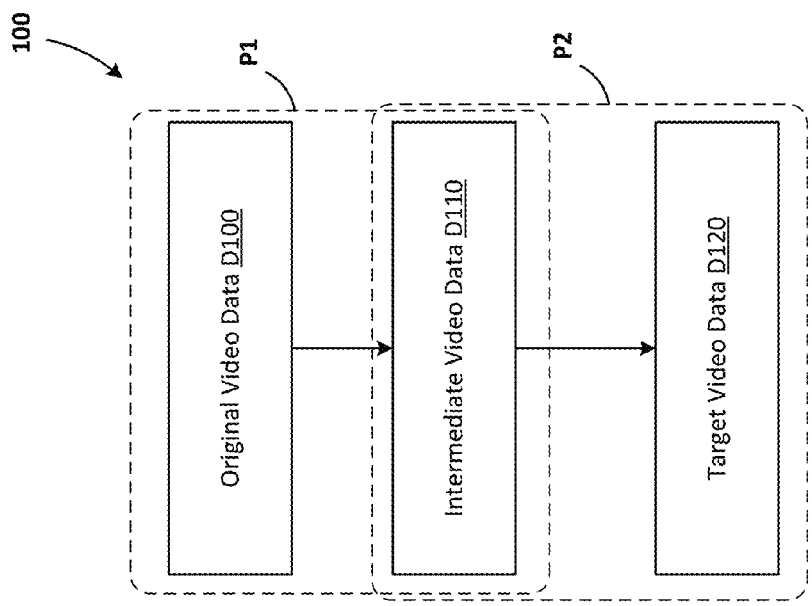
FIG. 1 is a diagram that illustrates flow of video data through a multi-pass color space conversion process, according to at least one example embodiment.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of structural elements may be reduced or exaggerated for clarity. The use of similar or identical reference numbers in the various drawings is intended to indicate the presence of a similar or identical element or feature.

DETAILED DESCRIPTION OF THE EMBODIMENTS

While example embodiments may include various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

In the context of the current disclosure, color conversion may be defined as a reversible, affine transformation from one set of color basis vectors to another. Planar may refer to an arrangement where an image is broken into three component buffers, one buffer per basis vector. Interleaved may be defined as an alternative arrangement, where each location in the image buffer stores multiple values, one value for each basis vector. Subsampling may be defined as how, in the YV12 planar representation, the color planes for the U and V components are at a different resolution from the Y component.

FIG. 1 is a diagram that illustrates flow of video data through a multi-pass color space conversion process 100, according to an embodiment. Original video data D100, which can be defined within a first color space and can be converted to target video data D120 defined within a second color space using the multi-pass color space conversion process 100. The multi-pass color space conversion process 100 can be performed at a graphical processing unit (GPU) (not shown in FIG. 1), and the target video data D120 can be sent to and stored in a system memory for later use.

Specifically, as shown in FIG. 1, original video data D100, which can be in a first multi-component format (e.g., RGB, ARGB, XRGB and the like), can be converted to intermediate video data D110. This conversion from the original video data D100 to the intermediate video data D110 can be performed during a first pass P1 of conversion processing. The intermediate video data D110 can then be converted to target or final video data D120 (e.g., YUV, YV12, YV420, and the like) during a second pass P2 of conversion processing. Although two passes (P1 and P2) are shown in FIG. 1, conversion of original video data D100 to target or final video data D120 can be performed using more than two passes of conversion processing and can include multiple different intermediate video data that can have a variety of intermediate data formats.

The multi-pass color space conversion process 100 can be used to handle a variety of conversion scenarios. For example, the method and systems described herein can be used to perform readback-and-conversion from ARGB to YV12 at realtime performance levels. In addition, example embodiments perform the colorspace conversion, subsampling, and planarization on a graphical processing unit (GPU) (e.g., DirectX9-class GPU hardware or OpenGL GPU hardware), prior to transferring the transformed content back to system memory. (DIRECTX is a trademark of Microsoft Corporation and OPENGL is a trademark of Silicon Graphics, Inc.)

As another example, ARGB to YV12 conversion may utilize DirectX9's multiple-render-target capability, while working around the limitation that DirectX9 devices may not support rendering to 8-bit color targets. According to example embodiments, two passes (each rendering a full-frame quad with a custom pixel shader, with two 32-bit color target outputs) are used. 8-bit color targets are simulated by, for example, packing four (4) logical pixel samples into each element of the 32-bit RGBA color target. After readback, this data can be reinterpreted as single-component data.

Figure 2:
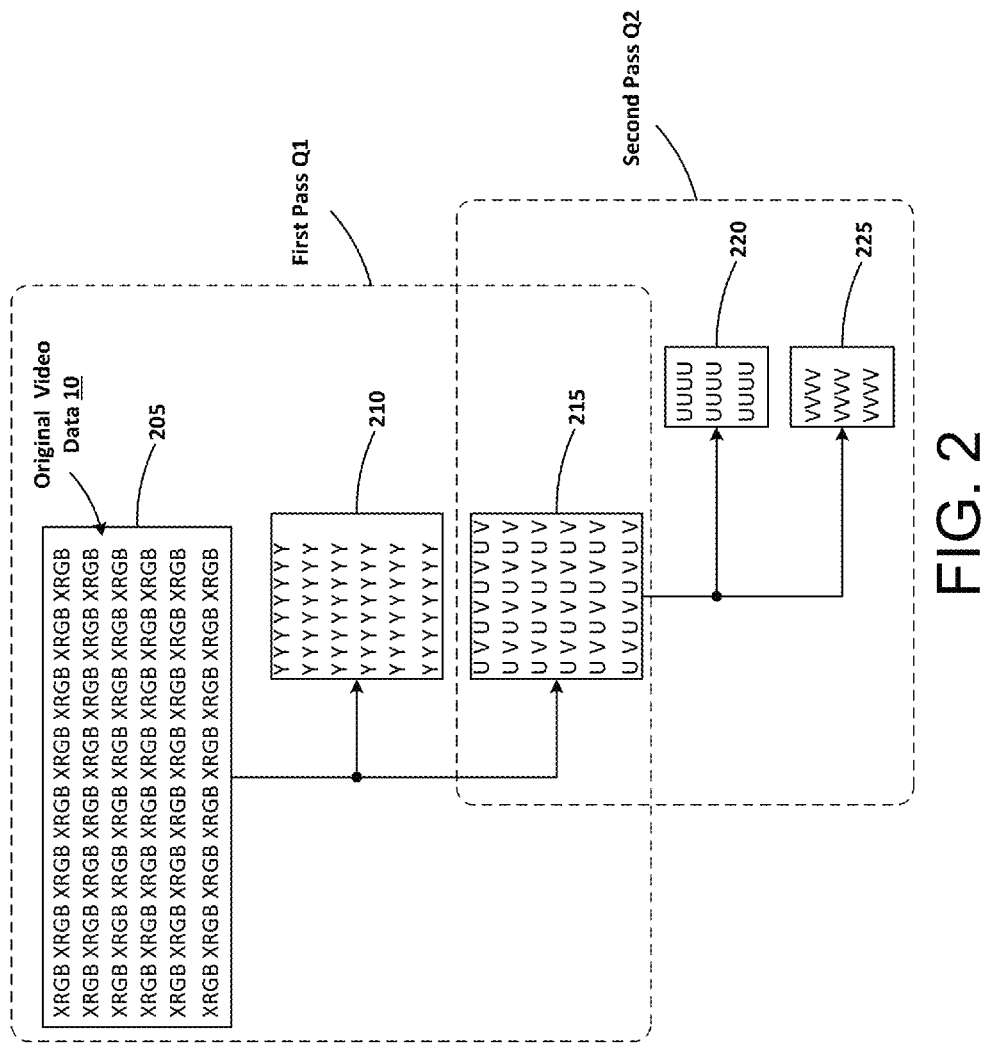
FIG. 2 illustrates a set of buffers or vectors and data flow between each of the buffers or vectors according to at least one example embodiment.

FIG. 2 illustrates a set of vectors and data flow between each of the vectors according to at least one example embodiment. In some embodiments, the vectors shown in FIG. 2 can represent, or can be buffers (or other memory construct) configured to store the vectors. Accordingly, the vectors can be referred to as buffers For example, vectors can be referred to as a buffer of pixel data.

As shown in FIG. 2, each vector includes an associated horizontal and vertical dimension. As shown in FIG. 2, a first vector 205 includes original video data 20 in a first multi-component format (e.g., RGB, ARGB, XRGB and the like). For example, the first vector 205 includes a horizontal dimension (or columns) equal to eight. The first vector 205 includes a vertical dimension (or rows) equal to six.

As shown in FIG. 2, the first vector 205 video data may be partially converted, in a first pass Q1, from the first multi-component format to component vectors of an intermediate multi-component format (e.g., YUV, YV12, YV420, and the like). The intermediate multi-component format is defined by two vectors—a second vector 210 and a third vector 215. The second vector 210 includes component video data (e.g., a 'Y' component of the YUV format) and the third vector 215 includes interleaved component video data (e.g., 'U' and 'V' components of the YUV format). The Y component may be a Y vector of a planar, subsampled YUV formatted video data. The U and V components may be a U and V vectors of a planar, subsampled YUV formatted video data.

In this embodiment, the interleaved components included in the third vector 215 are compressed to half the horizontal dimension of the original video data 10 (e.g., RGBA color space video data) included in the first vector 205. For example, as shown in FIG. 2, each row of the first vector 205 includes eight horizontal components (e.g., ARGB), whereas each row of the horizontal interleaved components shown in the third vector 215 includes four 'U' components and four 'V' components. Therefore, in a single (e.g., the first) pass the video data 10 is both converted and compressed with regard to the color components U and V.

The intermediate multi-component format (which is defined by vectors 210 and 215) may be converted to component vectors of a second multi-component format by de-interleaving the interleaved components shown in the third vector 215. The second multi-component format is defined by three vectors. For example, the second multi-component format may be defined as the second vector 210, a fourth vector 220, and a fifth vector 225. As shown in FIG. 2, the fourth vector 220 includes component video data (e.g., a 'U' component of the YUV format) and the fifth vector 225 includes component video data (e.g., a 'V' component of the YUV format). The components may be compressed to half the horizontal dimension of the original video data 10. For example, as shown in FIG. 2, each row of the first vector 205 includes six horizontal components (e.g., 'XRGB'), whereas each row of the components shown in the fourth vector 220 includes three 'U' components and each column of the components shown in the fifth vector 225 includes three 'V' components.

Accordingly, the original video data 10 may be partially converted, in a first pass Q1 (e.g., to the intermediate multi-component format), and completely converted in a second pass Q2 to the second multi-component format. Further details of the first pass and second pass video data conversion and compression will be described below in more detail with regards to FIG. 4.

Figure 3:
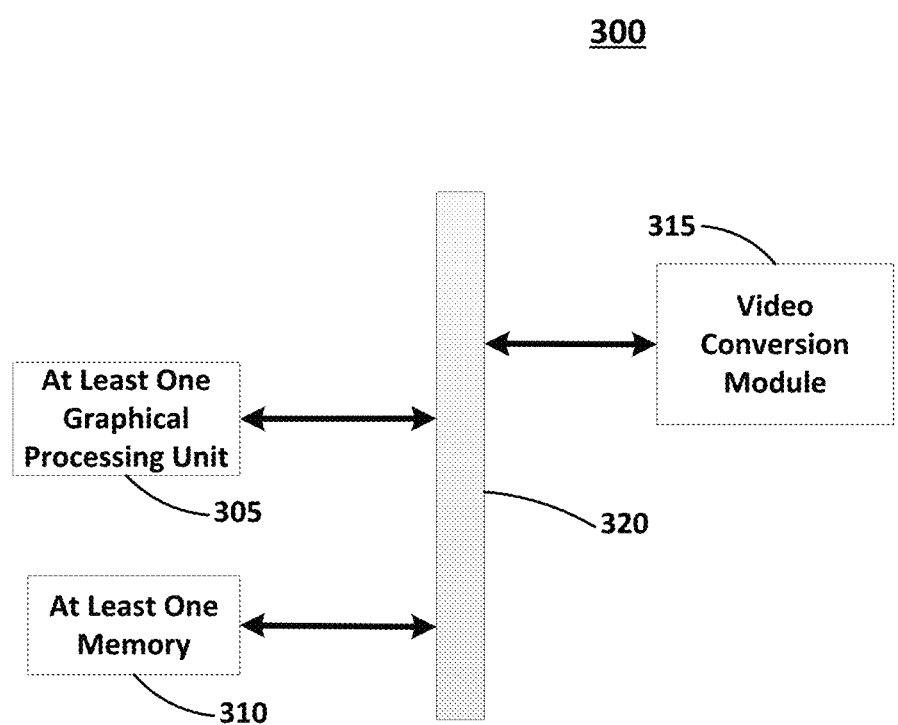
FIG. 3 illustrates a block diagram of an apparatus according to at least one example embodiment.

FIG. 3 illustrates a block diagram of an apparatus according to at least one example embodiment. As shown in FIG. 3, the apparatus 300 includes at least one graphical processing unit (GPU) 305, at least one memory 310 and a video conversion module 315. The at least one graphical processing unit (GPU) 305, the at least one memory 310 and the video conversion module 315 are communicatively coupled via bus 320. The apparatus 300 may be, for example, a video card or an integrated video circuit (e.g., application-specific integrated circuit).

In the example of FIG. 3, the apparatus 300 may be at least one computing device and should be understood to represent virtually any computing device configured to perform the methods described herein. As such, the apparatus 300 may be understood to include various standard components which may be utilized to implement the techniques described herein, or different or future versions thereof. By way of example, the apparatus 300 is illustrated as including the at least one graphical processing unit (GPU) 305, as well as at least one memory 310 (e.g., a computer readable storage medium).

Thus, as may be appreciated, the at least one graphical processing unit (GPU) 305 may be utilized to execute instructions stored on the at least one memory 310, so as to thereby implement the various features and functions described herein, or additional or alternative features and functions. Of course, the at least one graphical processing unit (GPU) 305 and the at least one memory 310 may be utilized for various other purposes. In particular, it may be appreciated that the at least one memory 310 may be understood to represent an example of various types of memory and related hardware and software which might be used to implement any one of the modules described herein.

The video conversion module 315 may be configured to convert video data from a first multi-component format (e.g., RGB, ARGB, XRGB and the like) to a second multi-component format (e.g., YUV, YV12, YV420, and the like). The video conversion module 315 may include code segments (e.g., software) that when executed by the GPU 305, cause the GPU to perform the functionality of the video conversion module 315. Alternatively, or in addition, the video conversion module 315 may be a hardware component including an additional GPU. Further, the at least one memory 310 may be an on-board memory of the GPU (e.g., directly connected to the GPU or level 1 processor memory) and/or a stand alone memory (e.g., connected to the GPU via an external (to the GPU) bus). The at least one memory 310 may include associated buffers configured to store video data vectors (e.g., the vectors described above with regard to FIG. 2).

The associated buffers may be permanently allocated and/or overwritten during execution of the methods described herein. For example, memory allocated to each of the associated buffers may be released for reallocation when the associated vector is no longer an active object. The associated vector may no longer an active object when a vector of conversion is complete. For example, memory (e.g., a buffer) associated with the first vector 205 may be reallocated upon completion of the first pass Q1. For example, memory (e.g., a buffer) associated with the third vector 215 may be reallocated upon completion of the second pass Q2.

The conversion of the original video data 10 from the first multi-component format to the second multi-component format can be performed during multiple passes and using one or more intermediate conversions. For example, the video conversion module 315 may convert video data from the first multi-component format to an intermediate multi-component format (during a first pass). This first pass can be referred to as a partial conversion. The intermediate multi-component format may include a first component, and can include a second component interleaved with a third component. The video conversion module 315 may be configured to complete the conversion to the second multi-component format by de-interleaving the second and third components (during a second pass). One or more of the second multi-components may be compressed. For example, UV subsampling (e.g., compression) may include a 50% reduction in the UV data because multiple render targets are used. For example, in the first pass, multiple render targets may require the two render targets to have the same width and height. Therefore, the Y buffer has the same dimensions as the interleaved UV buffer; as a result, a 50% compression of the data going into the UV buffer occurs. For example, one or more of the second multi-components may be half compressed in a vertical and/or a horizontal direction. The first multi-component format video data and the second multi-component format video data may be stored in a memory (e.g., at least one memory 310) as a buffer (e.g., as described above with regard to FIG. 2).

Figure 4:
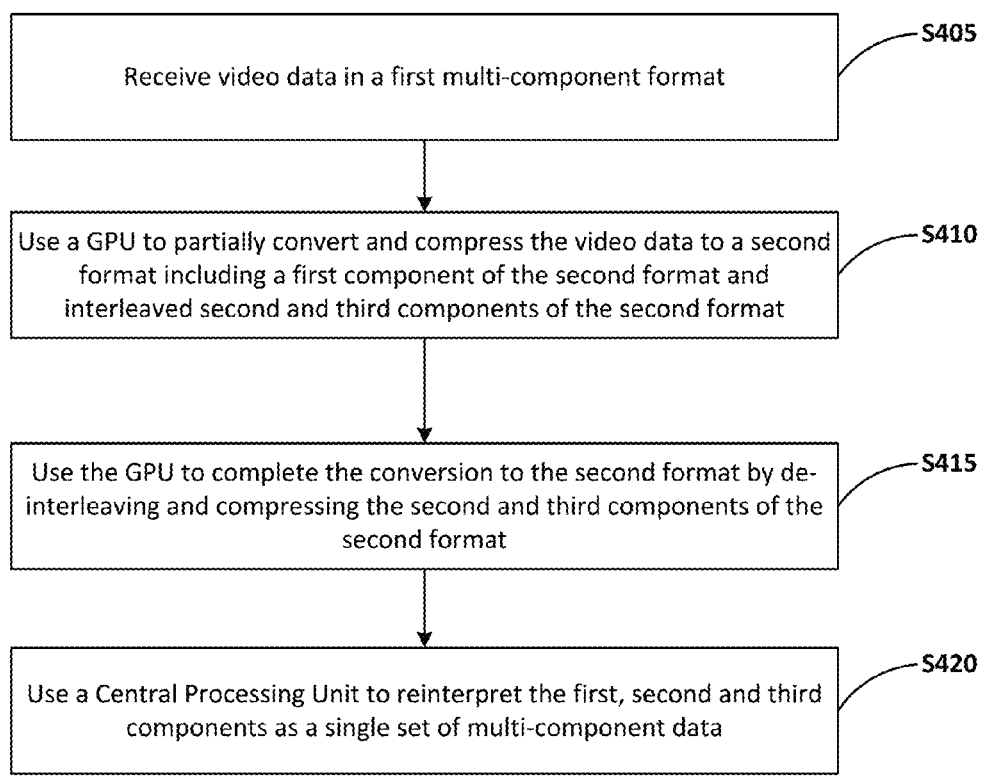
FIG. 4 illustrates a method for converting video data according to an example embodiment.

FIG. 4 illustrates a method for converting video data according to an example embodiment. The method steps described with regard to FIG. 4 may be executed as software code stored in a memory (e.g., at least one memory 310) associated with a video card (e.g., as shown in FIG. 3) and executed by at least one processor (e.g., at least one GPU 305) associated with the video card. For example, the processor may be associated with one or more of the blocks (e.g., the video conversion module 315) or the apparatus 300. However, alternative embodiments are contemplated such as a video card embodied as a special purpose processor.

For example, the method steps may be performed by an application-specific integrated circuit, or ASIC. For example, the ASIC may be configured as one or more of the blocks (e.g., the video conversion module 315) and/or the apparatus 300. Although the steps described below are described as being executed by a processor, the steps are not necessarily executed by a same processor. In other words, at least one processor may execute the steps described below with regard to FIG. 4.

For example, according to example embodiments, ARGB to YV12 conversion may utilize DirectX9's multiple-render-target capability, while working around the limitation that DirectX9 devices may not support rendering to 8-bit color targets. According to example embodiments, two passes of the multiple-render-target (each rendering a full-frame quad with a custom pixel shader, with two 32-bit color target outputs) are used. 8-bit color targets are simulated by, for example, packing four (4) logical pixel samples into each element of the 32-bit RGBA color target. After readback, this data can be reinterpreted as single-component data.

As shown in FIG. 4, in step S405 a graphical processing unit (GPU) receives video data in a first multi-component format. For example, the GPU (e.g., at least one GPU 305) receives one or more frames of video data. The video data may be stored as a vector and/or in a buffer (e.g., vector 205 stored in at least one memory 310) and received by the GPU via a data bus (e.g., bus 320). The video data may be in a first multi-component format. For example, the video data may be formatted as an interleaved XRGB (e.g., RGBA) color space.

In step S410 the GPU partially converts and compresses the video data to a second format including a first component of the second format and interleaved second and third components of the second format. For example, the GPU (e.g., at least one GPU 305) may be configured to execute a fragment shader which writes to multiple color targets (or multiple render targets, or which writes multiple color outputs). with the first multi-component video data as an input and output the first component of the second format and interleaved second and third components of the second format. For example, in a first pass the GPU may receive as an input the vector 205 (formatted as an interleaved XRGB color space) and output vector 210 formatted as a Y (luminance or brightness) vector) and vector 215 (formatted as an interleaved UV color space).

In addition to conversion, the aforementioned interleaved second and third components (e.g., UV components) may be compressed. For example, the interleaved second and third components may be compressed to half the vertical dimension of the video data. For example, as shown in FIG. 2, each row of the first vector 205 includes eight vertical components (e.g., 'XRGB'), whereas each row of the vertical interleaved components shown in the third vector 215 includes four 'U' components and four 'V' components.

Each of the first component and the interleaved second and third components may be rendered as a full-frame utilizing a custom vertex and pixel shader. A pixel shader may be a graphics function (executed by a GPU) configured to calculate effects on a per-pixel basis. The pixel shader may be configured to provide control for determining the lighting, shading, and color of each individual pixel, allowing creation of somewhat unique surface effects. Pixel shaders may be implemented using a shading language (e.g., high level shading language (HLSL)). For example, the shading language may include a pixel shader function called 'pixelMainStepS410' paired with a vertex shader function called 'vertexMainStepS410' which may be configured to multiply a row vector and a column vector using matrix math and pack the resultant multi-dimension vector into a given four-component vector until the variable will straddle a 4-vector boundary. Example first pass code using HLSL is as follows:

```
// Constants provided to shader execution.
extern uniform float src_width;
extern uniform float src_height;
texture t;
sampler s;
// Inputs are the coordinates of a textured rectangle.
void vertexMainStepS410(float4 in_position : POSITION,
            float2 in_texCoord : TEXCOORD0,
            out float4 out_position : POSITION,
            out float2 texCoord0 : TEXCOORD0,
            out float2 texCoord1 : TEXCOORD1,
            out float2 texCoord2 : TEXCOORD2,
            out float2 texCoord3 : TEXCOORD3) {
    // For alignment, pretend that the source is slightly wider than it is.
    float bloated_src_width = src_width + 3.5 - fmod(src_width - 0.5, 4);
    in_texCoord.x *= bloated_src_width / src_width;
    // Address full fragments in the output by adjusting positions.
    out_position = in_position +
            float4(-4 / bloated_src_width, 1 / src_height, 0, 0);
    // Set up four horizontally adjacent texture samples.
    float2 one_texel_x = float2(1 / src_width, 0);
    texCoord0 = in_texCoord - 1.5f * one_texel_x;
    texCoord1 = in_texCoord - 0.5f * one_texel_x;
    texCoord2 = in_texCoord + 0.5f * one_texel_x;
    texCoord3 = in_texCoord + 1.5f * one_texel_x;
};
// Input texture coordinates correspond to four horizontally adjacent samples,
// configured in the vertex shader.
void pixelMainStepS410(float2 texCoord0 : TEXCOORD0,
            float2 texCoord1 : TEXCOORD1,
            float2 texCoord2 : TEXCOORD2,
            float2 texCoord3 : TEXCOORD3,
            out float4 yyyy : COLOR0,
            out float4 uuvv : COLOR1) {
    // Color conversion constants.
    const float3x1 rgb_to_y = float3x1( +0.257f, +0.504f, +0.098f );
    const float3x1 rgb_to_u = float3x1( -0.148f, -0.291f, +0.439f );
    const float3x1 rgb_to_v = float3x1( +0.439f, -0.368f, -0.071f );
    const float y_bias    = 0.0625f;
    const float uv_bias   = 0.5f;
    // Load the four texture samples into a matrix.
    float4x3 rgb_quad_pixel = float4x3(tex2D(s, texCoord0).rgb,
            tex2D(s, texCoord1).rgb,
            tex2D(s, texCoord2).rgb,
            tex2D(s, texCoord3).rgb);
    // Average adjacent texture samples while converting RGB->UV.
    float2x3 rgb_double_pixel = float2x3(rgb_quad_pixel[0] + rgb_quad_pixel[1],
                rgb_quad_pixel[2] + rgb_quad_pixel[3]);
    float2 uu = mul(rgb_double_pixel, rgb_to_u / 2);
    float2 vv = mul(rgb_double_pixel, rgb_to_v / 2);
    // RGB->Y conversion (x4). Repack the byte order for interpretation as YV12.
    yyyy.bgra = mul(rgb_quad_pixel, rgb_to_y) + y_bias;
    // Apply UV bias term; pack U and V together.
    uuvv.xyzw = float4(uu, vv) + uv_bias;
};
```

In step S415 the GPU completes the conversion to the second format by de-interleaving and compressing the second and third components of the second format. For example, the interleaved second and third components may be the interleaved components shown in the third vector 215. For example, the GPU (e.g., at least one GPU 305) may execute a multiple-render-target function with the interleaved second and third components as an input and output de-interleaved second and third components of the second format. For example, in a second pass the GPU may receive as an input the vector 215 (formatted as an interleaved UV color space) and output vector 220 (formatted as a U (chrominance) color space) and vector 225 (formatted as a V (chrominance) color space).

The components may be compressed to half the vertical dimension of the video data. For example, as shown in FIG. 2, each column of the first vector 205 includes six vertical components (e.g., 'XRGB'), whereas each column of the components shown in the fourth vector 220 includes three 'U' components and each column of the components shown in the fifth vector 225 includes three 'V' components.

Each of the de-interleaved second and third components may be rendered as a full-frame utilizing a custom vertex and pixel shader. A pixel shader may be a graphics function (executed by a GPU) configured to calculate effects on a per-pixel basis. The pixel shader may be configured to provide control for determining the lighting, shading, and color of each individual pixel, allowing creation of somewhat unique surface effects. Pixel shaders may be implemented using a high level shading language (HLSL). For example, the HLSL may include a vertex shader function called 'vertexMainStepS415' configured to de-interleave the UV vector and pack the resultant multi-dimension vector into a given four-component vector (for each of the U and V vectors) until the variable will straddle a 4-vector boundary. Example second pass line code using HLSL is as follows:

```
// Constants provided to shader execution.
extern uniform float src_width;
extern uniform float src_height;
texture t;
sampler s;
// Inputs are the coordinates of a textured rectangle.
void vertexMainStepS415(in float4 in_position : POSITION,
            in float2 in_texCoord : TEXCOORD0,
            out float4 out_position : POSITION,
            out float2 texCoord0 : TEXCOORD0,
            out float2 texCoord1 : TEXCOORD1) {
    // For alignment, pretend that the source is slightly bigger than it is.
    float bloated_src_width = src_width + 1.5 - fmod(src_width - 0.5, 2);
    float bloated_src_height = src_height + 1.5 - fmod(src_height - 0.5, 2);
    in_texCoord.x *= bloated_src_width / src_width;
    in_texCoord.y *= bloated_src_height / src_height;
    // Address full fragments in the output by adjusting positions.
    out_position = in_position +
            float4(-2 / bloated_src_width, 2 / bloated_src_height, 0, 0);
    // Set up two horizontally adjacent texture samples.
    float2 one_texel_x = float2(1 / kRenderTargetSize.x, 0);
    texCoord0 = in_texCoord - 0.5f * one_texel_x;
    texCoord1 = in_texCoord + 0.5f * one_texel_x;
};
```

-continued

```
// Input texture coordinates correspond to two horizontally adjacent
samples,
// configured in the vertex shader.
void vertexMainStepS415(float2 texCoord0 : TEXCOORD0,
        float2 texCoord1 : TEXCOORD1,
        out float4 uuuu : COLOR0,
        out float4 vvvv : COLOR1) {
    // Bilinear interpolation during sampling effects vertical scaling.
    float4 lo__uuvv = tex2D(s, texCoord0);
    float4 hi__uuvv = tex2D(s, texCoord1);
    // Repack the byte order for interpretation as YV12.
    uuuu.bgra = float4(lo__uuvv.xy, hi__uuvv.xy);
    vvvv.bgra = float4(lo__uuvv.zw, hi__uuvv.zw);
};
```

In step S420 a Central Processing Unit (CPU) reinterprets the first, second and third components as a single set of multi-component data. For example, the GPU may combine the first, second and third components as a single set of multi-component data and output the single set of multi-component as input for a video encoder that includes inputs in a planar, subsampled YUV format (e.g., YV12).

Figure 5:
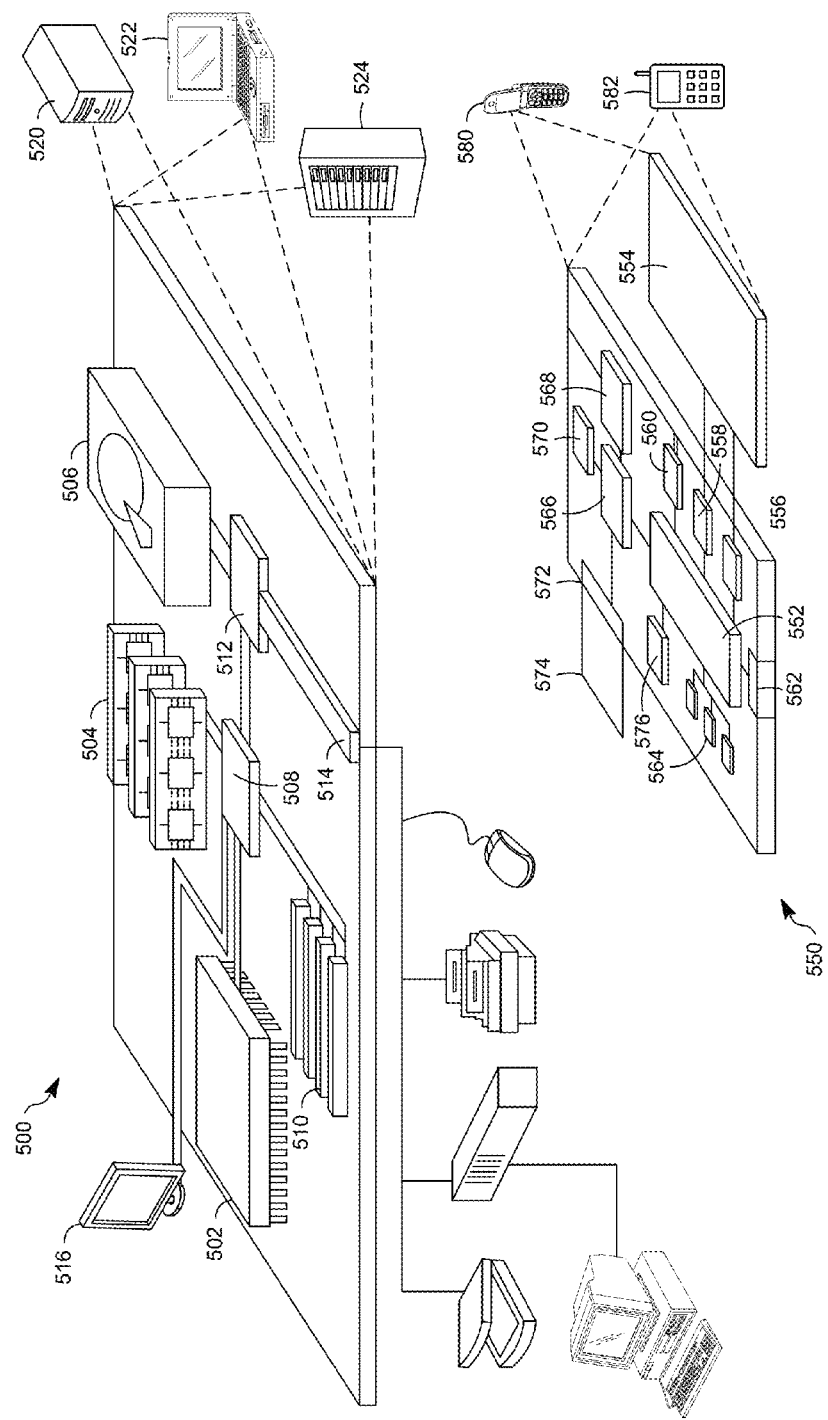
FIG. 5 shows an example of a computer device and a mobile computer device that can be used to implement the techniques described here.

FIG. 5 shows an example of a generic computer device 500 and a generic mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). For example, one of the high speed expansion ports may include a graphics card including a graphical processing unit (e.g., at least one GPU 305) and an attached frame buffer memory. In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552, that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550. Device 550 may also may also include a GPU 576 with an attached frame buffer memory configured to perform at least the above described methods.

The computing device 550 may be implemented in a number of different forms, as shown in the figure. For example, it may be implemented as a cellular telephone 580. It may also be implemented as part of a smart phone 582, personal digital assistant, or other similar mobile device.

Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A method, comprising:
    converting, during a first pass, video data from a first multi-component format to an intermediate multi-component format,
        the intermediate multi-component format including a first video component generated as a first vector of a same vertical dimension as the video data and a same horizontal dimension as the video data,
        the intermediate multi-component format including a second video component interleaved with a third video component generate as a second vector of the same vertical dimension as the video data and the same horizontal dimension as the video data such that each of the second video component and the third video component are compressed to half the vertical dimension of the video data; and
    converting, during a second pass, the video data from the intermediate multi-component format to a second multi-component format by de-interleaving the second component and third component.

2. The method of claim 1, wherein converting the video data from the intermediate multi-component format to a second multi-component format includes:
    generating the second video component as a first vector of half a vertical dimension as the video data and half a horizontal dimension as the video data; and
    generating the third video component as a second vector of half a vertical dimension as the video data and half a horizontal dimension as the video data.

3. The method of claim 1, wherein the first multi-component format is an interleaved XRGB color space.

4. The method of claim 1, wherein the second multi-component format is a planar subsampled YUV format.

5. The method of claim 1, wherein
    the first video component is a Y vector of planar, subsampled YUV formatted video data, and
    the interleaved second video component and third video component are interleaved U and V vectors of the planar, subsampled YUV formatted video data.

6. The method of claim 1, further comprising:
    reinterpreting the first video component, the second video component and the third video component as a single set of multi-component data.

7. The method of claim 6, wherein
    the first video component is a Y vector of planar, subsampled YUV formatted video data,
    the second video component is a U vector of the planar, subsampled YUV formatted video data, and
    the third video component is a V vector of the planar, subsampled YUV formatted video data.

8. A non-transitory computer readable medium including code segments that when executed by a processor cause the processor to perform steps comprising:
    convert video data from a first multi-component format to a partially converted second multi-component format, the partially converted second multi-component format including a first video component and an interleaved second video component and third video component, wherein the converting of the video data from the first multi-component format to the partially converted second multi-component format includes,
        generating the first video component as a first vector of a same vertical dimension as the video data and a same horizontal dimension as the video data, and
        generating an interleaved second video component and third video component in a second vector of the same vertical dimension as the video data and the same horizontal dimension as the video data such that each of the second video component and the third video component are compressed to half the vertical dimension of the video data; and complete the conversion to the second multi-component format by de-interleaving the second component and the third component.

9. The method of claim 8, wherein completing the conversion to the second multi-component format includes:
generating the second video component as a first vector of half a vertical dimension as the video data and half a horizontal dimension as the video data; and
generating the third video component as a second vector of half a vertical dimension as the video data and half a horizontal dimension as the video data.

10. A video card, comprising:
a memory including:
a first buffer, the first buffer storing a vector including a first horizontal dimension and a second horizontal dimension, the first buffer including video data in a first multi-component format;
a second buffer, the second buffer storing a vector including the first horizontal dimension and the second horizontal dimension;
a third buffer, the third buffer storing a vector including the first horizontal dimension and the second horizontal dimension;
a fourth buffer, the fourth buffer storing a vector including half the first horizontal dimension and half the second horizontal dimension; and
a fifth buffer, the fifth buffer storing a vector including half the first horizontal dimension and half the second horizontal dimension; and
a graphical processing unit configured to:
convert, during a first pass, video data from a first multi-component format to an intermediate multi-component format, the intermediate multi-component format including a first video component, the intermediate multi-component format including a second video component interleaved with a third video component;
store the first component in the second buffer;
store the interleaved second video and third video component in the third buffer;
converting, during a second pass, the video data from the intermediate multi-component format to a second multi-component format by de-interleaving the second video component and third video component;
store a compressed second video component in the fourth buffer; and
store a compressed third video component in the fifth buffer.

11. The video card of claim 10, wherein the memory is an on-board memory of the graphical processing unit.

12. The video card of claim 10, wherein memory allocated to each of the first buffer, the second buffer, the third buffer, the fourth buffer, and the fifth buffer are released for reallocation when the associated vector is no longer an active object.

13. The video card of claim 10, wherein converting video data from a first multi-component format to an intermediate multi-component format includes:
generating the first video component as a first vector of a same vertical dimension as the video data and a same horizontal dimension as the video data; and
generating interleaved second video component and third video component in a second vector of the same vertical dimension as the video data and the same horizontal dimension as the video data such that each of the second video component and the third video component are compressed to half the vertical dimension of the video data.

14. The video card of claim 10, wherein converting the video data from the intermediate multi-component format to a second multi-component format includes:
generating the second video component as a first vector of half the vertical dimension as the video data and half the horizontal dimension as the video data; and
generating the third video component as a second vector of half the vertical dimension as the video data and half the horizontal dimension as the video data.

15. The video card of claim 10, wherein
the first multi-component format is an interleaved XRGB color space, and
the second multi-component format is a planar subsampled YUV format.

16. The video card of claim 10, wherein
the first video component is a Y vector of planar, subsampled YUV formatted video data, and
the interleaved second video component and third video component are interleaved U and V vectors of the planar, subsampled YUV formatted video data.

17. The video card of claim 10, wherein the graphical processing unit is further configured to:
reinterpreting the first video component, the second video component and the third video component as a single set of multi-component data.

18. The video card of claim 10, wherein
the first video component is a Y vector of planar, subsampled YUV formatted video data,
the second video component is a U vector of the planar, subsampled YUV formatted video data, and
the third video component is a V vector of the planar, subsampled YUV formatted video data.

19. A method, comprising:
converting, during a first pass, video data from a first multi-component format to an intermediate multi-component format,
the intermediate multi-component format including a first video component, and
the intermediate multi-component format including a second video component interleaved with a third video component,
the second video component being generated as a first vector of half a vertical dimension as the video data and half a horizontal dimension as the video data, and
the third video component being generated as a second vector of half the vertical dimension as the video data and half the horizontal dimension as the video data; and
converting, during a second pass, the video data from the intermediate multi-component format to a second multi-component format by de-interleaving the second video component and the third video component.

20. The method of claim 19, wherein converting video data from a first multi-component format to an intermediate multi-component format includes:
generating the first video component as a first vector of a same vertical dimension as the video data and a same horizontal dimension as the video data.

21. The method of claim 19, wherein the first multi-component format is an interleaved XRGB color space.

22. The method of claim 19, wherein the second multi-component format planar is a subsampled YUV format.

23. The method of claim 19, wherein
the first video component is a Y vector of planar, subsampled YUV formatted video data, and
the interleaved second video component and third video component are interleaved U and V vector of the planar, subsampled YUV formatted video data.

24. The method of claim 19, further comprising:
reinterpreting the first video component, the second video component and the third video component as a single set of multi-component data.

25. The method of claim 24, wherein
the first video component is a Y vector of planar, subsampled YUV formatted video data,
the second video component is a U vector of the planar, subsampled YUV formatted video data, and
the third video component is a V vector of the planar, subsampled YUV formatted video data.

* * * * *